(12) United States Patent
Richards

(10) Patent No.: US 8,556,050 B2
(45) Date of Patent: Oct. 15, 2013

(54) ELECTRICAL CONNECTION DEVICE FOR ELECTRIC VEHICLES

(76) Inventor: Bryan Richards, Mill Creek, WA (US)

( * ) Notice: Subject to any disclaimer, the term of this patent is extended or adjusted under 35 U.S.C. 154(b) by 248 days.

(21) Appl. No.: 13/071,317

(22) Filed: Mar. 24, 2011

(65) Prior Publication Data

US 2011/0233018 A1 Sep. 29, 2011

Related U.S. Application Data

(60) Provisional application No. 61/317,333, filed on Mar. 25, 2010.

(51) Int. Cl.
*B60L 5/00* (2006.01)

(52) U.S. Cl.
USPC ............................................ 191/10; 191/45 R

(58) Field of Classification Search
USPC .......... 191/10, 45 R, 46, 49, 50, 52, 59, 59.1, 191/60, 60.1–60.5, 63.3, 64–68; 104/23.1, 104/23.2
See application file for complete search history.

(56) References Cited

U.S. PATENT DOCUMENTS

| | | | | |
|---|---|---|---|---|
| 3,479,471 A | * | 11/1969 | Smith et al. ................. | 191/45 R |
| 3,610,844 A | * | 10/1971 | Blanchard ................... | 191/45 R |
| 3,737,590 A | * | 6/1973 | Johnston ..................... | 191/45 R |
| 5,542,356 A | * | 8/1996 | Richert et al. ............... | 104/289 |
| 5,673,774 A | * | 10/1997 | Trapp et al. ..................... | 191/49 |
| 2012/0186927 A1 | * | 7/2012 | Suh et al. ....................... | 191/10 |

* cited by examiner

*Primary Examiner* — Zachary Kuhfuss
(74) *Attorney, Agent, or Firm* — Parsons Behle & Latimer

(57) ABSTRACT

An electrical connection device for an electric vehicle includes an arm, attached to a moving vehicle, and an air-bearing electrical-pickup device, disposed at a distal end of the arm. The air-bearing electrical-pickup device is positionable adjacent to an electric-powered guideway and configured to receive electrical power therefrom. The air bearing electrical-pickup device includes an air inlet positioned to provide a flow of air between the guideway and the air bearing device, and an induction loop, configured to sense ferromagnetic material in the guideway.

19 Claims, 8 Drawing Sheets

ELECTRICAL CONNECTION DEVICE FOR ELECTRIC VEHICLES

CROSS REFERENCE TO RELATED APPLICATIONS

This application claims priority under 35 USC §119 to U.S. Provisional Patent Ser. No. 61/317,333, filed on Mar. 25, 2010, and titled "ELECTRICAL CONNECTION DEVICE FOR ELECTRIC VEHICLES," the entire contents of which are hereby incorporated by reference.

BACKGROUND

1. Field of the Invention

The present invention relates generally to electric vehicles. More particularly, the present invention relates to an electrical connection device that allows electric vehicles to draw power from a vehicle guideway and/or related structure.

2. Related Art

To reduce oil dependence, it can be very desirable to make cars connect to the electric grid. Connecting by the way of batteries and other storage devices is not likely to displace the internal combustion engine by 2020, unless subsidized by governments. The subsidies required are significant and may be required beyond 2020. Furthermore, large capacity battery packs can be heavy, and expensive. While battery costs are dropping and energy densities are increasing, the efficiency and affordability of these systems remain questionable.

Systems that provide grid power to moving vehicles have been developed and used on transit vehicles, such as trolleys and busses. Trolley buses and trains can have direct, electrical connection during operation, but it is not believed that private vehicles have been developed that exhibit this attribute. Electric trolleys and buses use continuous overhead wire, which creates complicated, overhead intersections. The overhead wires are visually distracting, which limit electric grid deployment and this directly limit electric vehicle deployment. Rapid connection between the electric grid and vehicles could reduce the need for continuous overhead wires by enabling intermittent connection; thus, resolving both issues. This should expand the electric gird significantly for public electric vehicles. The EV Mouse and its rapid-connection capability may also enhance private electric-vehicle viability.

SUMMARY

It has been recognized that it would be advantageous to develop an efficient electrical connection device between the electrical grid and a moving electric vehicle.

It has also been recognized that it would be advantageous to have a system that enables electric-power transmission and electric-power delivery to moving electric vehicles or intermittent connecting electric vehicles.

In accordance with one embodiment thereof, the present invention provides an electrical connection device for an electric vehicle, comprising an arm, attached to a moving vehicle, and an air bearing pickup device, disposed at a distal end of the arm. The air bearing device is positionable adjacent to a conductor associated with the guideway, and includes an air inlet positioned to provide a flow of air between the guideway and the air bearing device. The air bearing device includes an induction loop, disposed around its circumference, the induction loop being configured to sense ferrous and/or magnetic material in the conductor via the Hall Effect. In one embodiment, the induction loop can also receive electric power from the conductor.

In accordance with another aspect thereof, the invention provides an electric vehicle for use with a guideway, comprising an extensible and retractable arm, attached to the vehicle, and an electrical connection device positioned at a distal end of the arm. The electrical connection device comprises an air bearing device, having means for providing a flow of air between the air bearing device and the guideway, means for transferring electrical power from the guideway to the vehicle, and means for tracking a position of the electrical connection device with respect to the guideway.

BRIEF DESCRIPTION OF THE DRAWINGS

Additional features and advantages of the invention will be apparent from the detailed description which follows, taken in conjunction with the accompanying drawings, which together illustrate, by way of example, features of the invention, and wherein.

DETAILED DESCRIPTION

Figure 1:
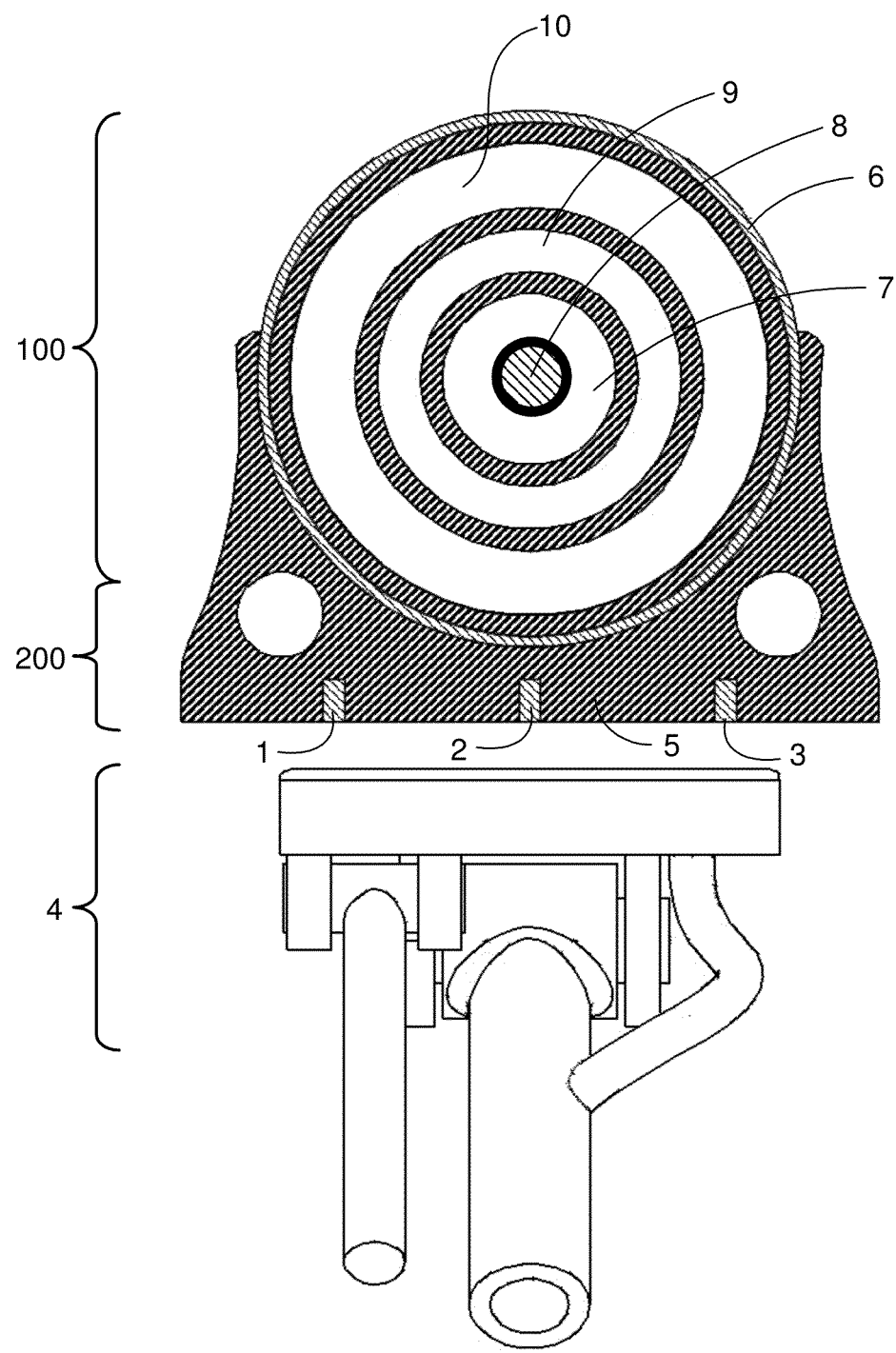
FIG. 1 is a simplified sectional view of an interconnection line and guideway for connecting electric vehicles to the grid, and a front view of an embodiment of an electrical connection device of the present invention.

Reference will now be made to exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

As used herein, the term "guideway" has reference to an elongate device that is positioned adjacent to a motion path of a vehicle and in sufficient proximity to the vehicle as to receive contact or near contact from an electrical connection device extended from the vehicle. The guideway can include electrical contacts for transmitting electrical power to the vehicle, and/or inductance loops to transmit and receive electric power, and ferrous or magnetic devices for providing a guideline for the vehicle. The guideway can be positioned above, below, or to a side of the motion path of the vehicle.

As used herein, the term "interconnection" refers to any type of electrical-power transmission device that is coupled with an electric-power-delivery or guideway, as defined above, whether providing DC or AC power. As described herein, interconnection lines can run, in parallel, with the guideway, whereby electric vehicles can connect to the electric grid through the periodic or continuous guideway.

As used herein, the term "intermittent electric vehicle" (IEV) means an electric vehicle that includes power storage capacity (e.g. a battery), but is also configured to interconnect to an electric guideway, so that such interconnection can be intermittent, if need be.

As noted above, connecting vehicles to the electric grid could greatly reduce oil dependence. However, connecting by the way of batteries, and other storage devices currently involves the use of large-capacity battery packs, which are heavy, bulky and expensive. Recharging of batteries also introduces significant down time, when the vehicle cannot be used. An efficient electrical connection device between the electrical grid and the electrical vehicle, while the vehicle is in motion, could create an efficient, electrical-vehicle framework by reducing the required electric-vehicle battery size and/or increase the life of the battery pack. While trolley busses and trains can have direct, electrical connection during operation, private vehicles do not generally exhibit this attribute. Trolley busses also require continuous overhead guidance, which creates complicated intersections. Enabling intermittent connection could be a helpful attribute for justifying the device and systemic solution for public and/or private vehicles.

Advantageously, the inventor has developed an electric connection device that allows electric vehicles to connect to the power grid while moving adjacent to a guideway. The inventor refers to this device, in various embodiments, as an "EV Mouse." The system as a whole, including the EV mouse, guideway and interconnection, is referred to collectively as an "EV Interconnection system."

Advances in Superconducting transmission have increased its potential utility for a number of electric-power transmission applications. Providing a superconducting DC interconnection could be one electric-power transmission option that runs mostly parallel, with an electric-power delivery apparatus. This combination could provide an efficient continuous or intermittent electric-power delivery method for rapid connection to electric vehicles.

The interconnection line (electric-power transmission or electric-power delivery) to Electric Vehicles (EVs), while the vehicles are in motion (including private vehicles) is one advantageous feature of the EV Mouse disclosed herein.

It is believed that small, rapid EV connection devices will emerge, especially for the intermittent needs of private vehicles. Consequently, in parallel, or perhaps in the proving phases, public vehicles will also benefit from intermittent and rapid EV connection to the electric grid. The intermittent connection capability is useful for various reasons. One is reducing the need for overhead intersection complexity in an electrical distribution system. It is believed that emerging standards suggest a future framework that will support the most efficient electric vehicle: that is, 100% Electric Vehicles with reduced battery back requirements due to intermittent connection during the commute. The simplicity, compared to hybrids, is compelling, and also avoids the need for long periods of down time for recharging. The electrical interconnection device (EV Mouse) disclosed herein enables precise proximity to the guideway with minimal mechanical guidance.

Referring now to FIG. 1 there is a sectional view of an interconnection line 100 and guideway 200 for connecting electric vehicles to the grid, and a front view of an embodiment of an electrical connection device or EV Mouse 4. 1 and 3 are electrical tracks. These can be non-ferrous. Item 2 is the guideline, which can be a ferrous or magnetized line. The guideline can also provide guidance without ferrous or magnetic material by way of the EV Mouse sensing currents in the guideway. In all three configurations, 2 is a ferrous or magnetized line or line of magnets. In a three-phase AC configuration, the guideline 2 is an electrical track. In a DC configuration, the guideline 2 is neutral (i.e. ground), and is electrically isolated. Alternatively, the guideline can be an electrically non-conductive line of magnets. In an induction configuration, the guideline can also be a ferrous or magnetized line or line of magnets.

Parts 1, 2 and 3 can vary according to configuration. If configured with inductance, the loops lie within the flat guideway. Part 4 is the air-bearing or EV Mouse. Part 5 is non-conductive material. Part 6 is insulation and/or shielding. Part 7 is an electric power conduit for DC electric power transmission or DC electric power delivery. This can be a superconducting power conduit. A refrigerant 8 can be used to cool the power conduit where it is a superconducting device. Part 9 is the refrigerant return.

Numeral 10 represents an annular space that can contain a partial vacuum. While a configuration for a superconducting electric power conduit is shown in the drawings, it is to be understood that elements 7, 8, 9 and 10 can be reconfigured for AC, non-refrigerated AC, or non-refrigerated DC. Any of these configurations can provide structural backing to the guideway. DC could be sectional superconducting, interfaced with non-superconducting cable, and still provide structural backing to the guideway.

Figure 2A:
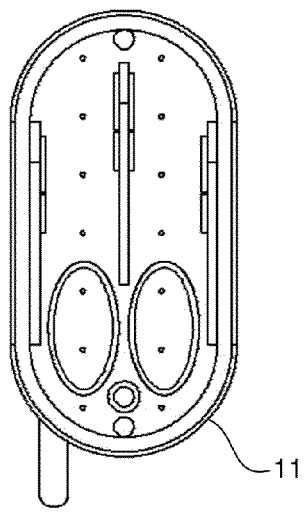
FIG. 2A is a top view of the electrical connection device embodiment of FIG. 1.

In FIG. 2A is a top view of one embodiment of an electrical connection device of the present invention. Part 11 indicates the location of a ferrous or magnet-sensing inductive loop disposed around the circumference of the air bearing. Multiple inductive loops can be provided, if desired. The inductive loop or loops can function as a Hall Effect device. As will be understood by those of skill in the art, the Hall Effect is a phenomenon of electromagnetism wherein a voltage difference is induced in an electrical conductor, such as a coil, in the presence of a magnetic field that is perpendicular to the current in the conductor. This voltage difference can allow detection of an adjacent magnetic field by virtue of motion of the conductor within the magnetic field. The induction loop thus provides an induced current as a result of motion adjacent to the guideline of the guideway, characteristics of the induced current indicating a position of the electrical connection device relative to the guideline. When used this way, the Hall Effect device in the EV Mouse operates as a Hall Effect sensor, allowing detection of the relative positions of the guideline and the EV Mouse. Where the magnetic field is particularly strong (e.g. produced by a large current in the adjacent magnetic field-producing element), the voltage difference can provide a source of electrical power through inductive coupling. In this way, a Hall Effect device can operate as both a sensor and a power transmission mechanism. In the inductive configuration, the inductive loop can also send and receive inductive electric power to and from the guideway.

Figure 2B:
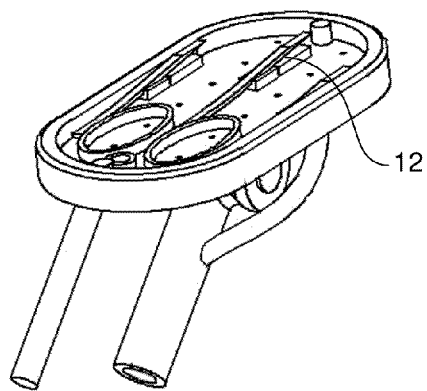
FIG. 2B is a perspective view of the electrical connection device embodiment of FIG. 1.
Figure 2C:
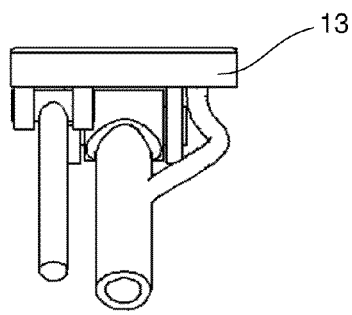
FIG. 2C is a front view of the electrical connection device embodiment of FIG. 1.
Figure 2D:
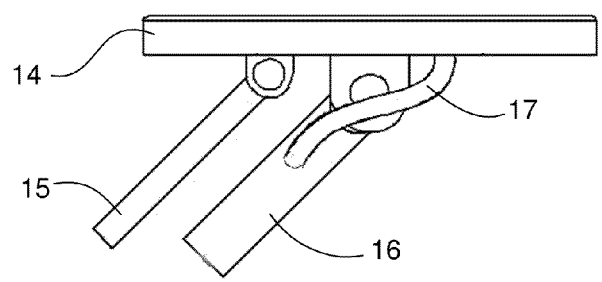
FIG. 2D is a right side view of the electrical connection device embodiment of FIG. 1.

The electrical connection device of the present invention could be above or below the vehicle, or to the side of the vehicle. Shown in FIG. 2B is a perspective view of an electrical connection device of the present invention, showing the electrical-connecting ribbon 12, height adjuster. Shown in FIG. 2C is a front view of an electrical connection device of the present invention, showing the front edge 13 of the device. Shown in FIG. 2D is a right-side view of an electrical connection device of the present invention. A structural arm 16 lifts the EV Mouse to its extended or deployed position, and an air supply line 17, which runs up the structural arm 16, provides a flow of air for the air bearing. The air supply line 17 can also contain wires that connect to the electrical-connecting ribbons. An EV Mouse actuator/shock 15 is attached near the rear edge 14 of the device, and is offset from the latitudinal centerline, as can be seen in FIG. 2C. This configuration enables a flatter stowage position, since the actuator and support arm 16 do not stack atop each other, but sit side-by-side when stowed. The configuration of the support arm 16 and actuator 15 as parallel arms also provides a self-leveling function, so that the air bearing remains substantially horizontal in both the deployed and stowed positions.

Figure 3A:
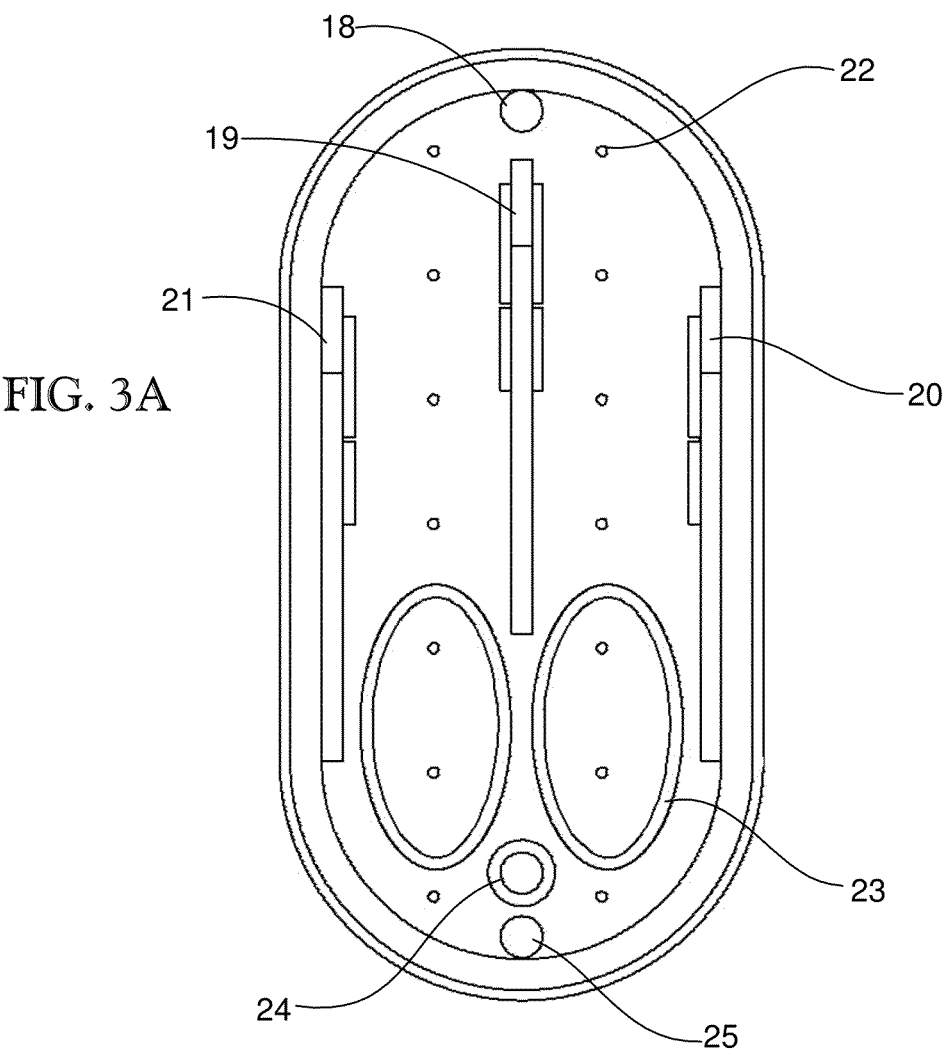
FIG. 3A is a close-up top view of the electrical connection device embodiment of FIG. 1, showing more detail.

Referring to FIG. 3A, the electrical connection device can include a back magnet 18 and a front magnet 25. Electrical ribbon connections 19, 20 and 21 are also provided, and function as discussed above. The electrical connection device can include multiple air inlets 22 for receiving a flow of air for producing the air bearing effect between the EV Mouse and the guideway. Pressurized air is pumped in through the inlets 22, and produces a cushion of air between the EV Mouse and the surface of the guideway. The magnets 18 and 25 are in close proximity to the front and back of the air bearing. A first ferrous or magnet-sensing inductive loop 23 is provided to detect the guideline and/or to receive power from the guideline, as disclosed herein. The electrical connection device can also include a second centered, ferrous magnet-sensing, inductive loop 24 to detect the guideline. Alternatively, element 24 can be an optical track sensor, and achieve similar feedback needed for functional requirements.

Figure 3B:
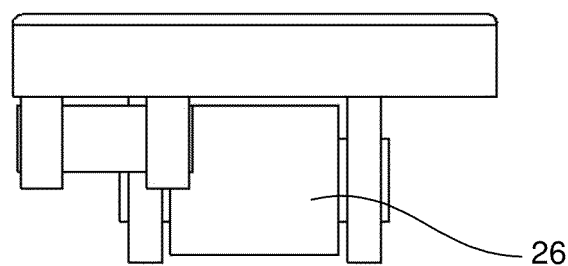
FIG. 3B is a rear view of the electrical connection device embodiment of FIG. 1.

Shown in FIG. 3B is a front view of an EV Mouse device, showing the front 26 of the support arm hinge connection. This connection can be a loose joint, which enables the air-bearing to passively fit flush to the guideway.

Figure 4:
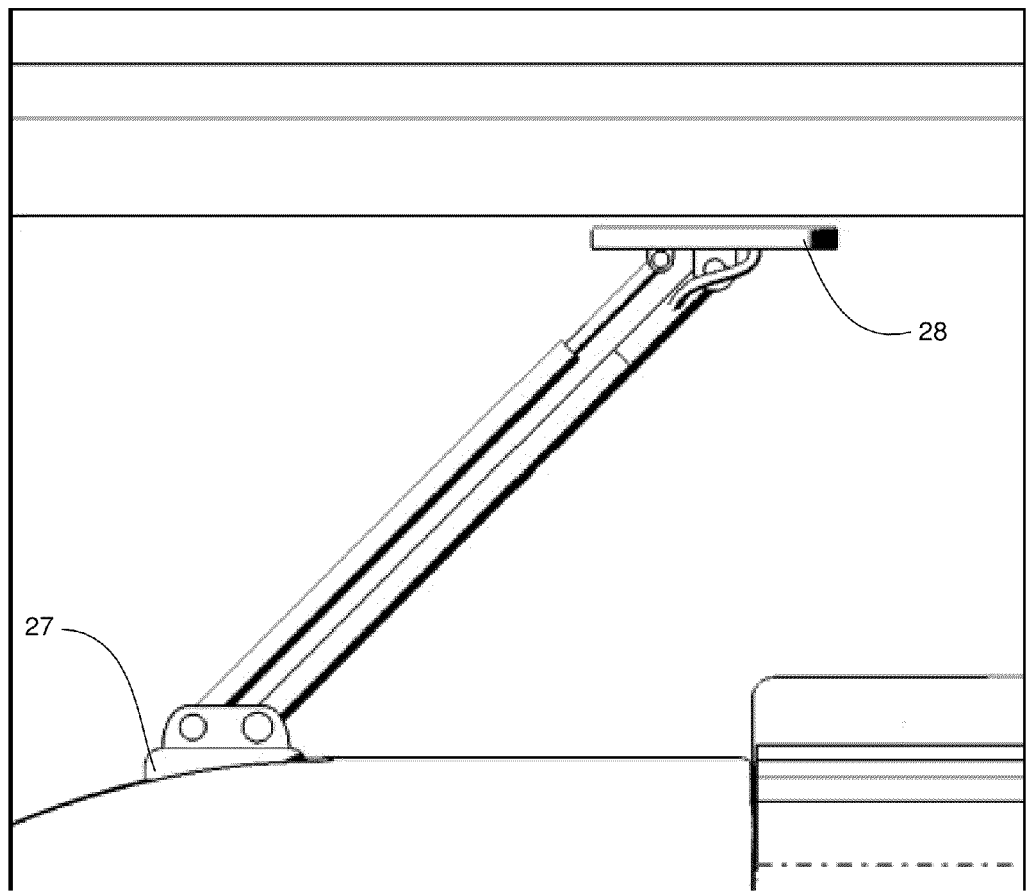
FIG. 4 is a side view of an embodiment of an electrical connection device and its rotational connection to the vehicle, in a deployed position.

As shown in FIG. 4, an extension arm 16 for an electrical connection device 28 can be connected to a vehicle via a rotational base 27, from which the arm extends to place the electrical connection device 28 close to a guideway above the vehicle. The rotational base 27 also includes hinges to allow pivoting of the arm within a vertical plane. This allows servo positioning and a free-floating mode when the EV Mouse is fully deployed to the guideway, relying on the EV Mouse magnets to guide, align and rotate the EV Mouse to the guideline in the guideway. The rotational base is also a positional sensor.

Figure 5:
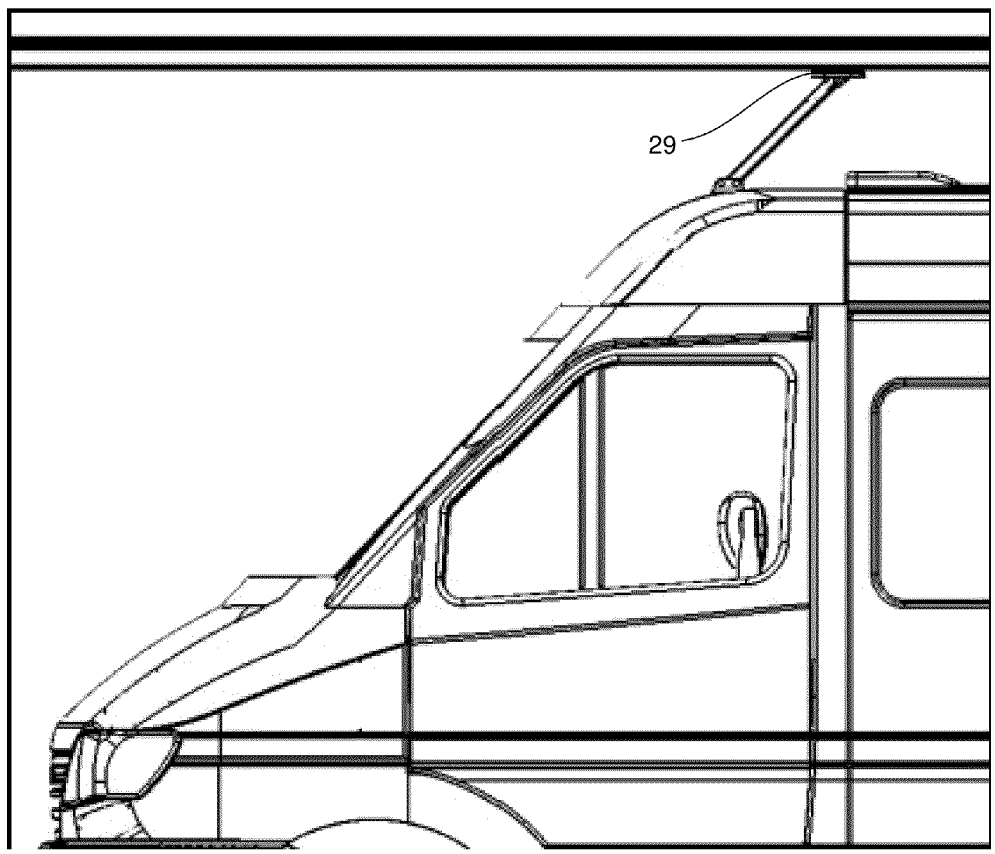
FIG. 5 is a side view of an embodiment of an electrical connection device in a deployed position.
Figure 6:
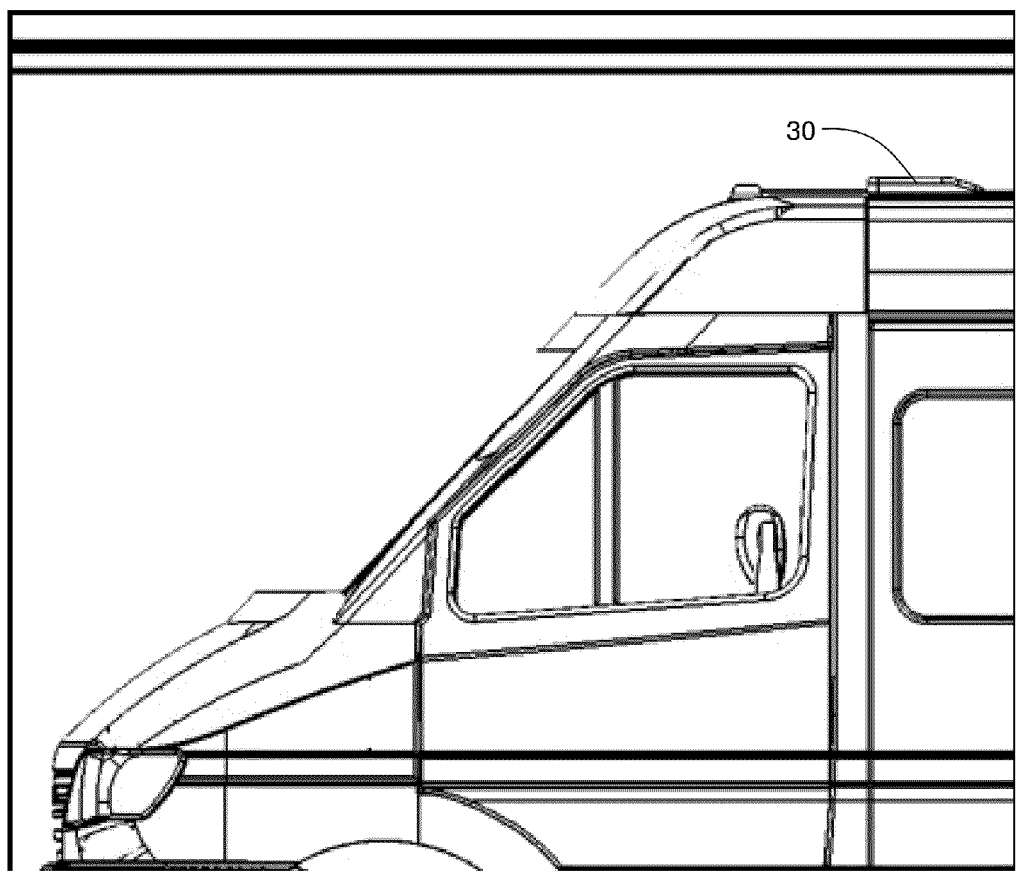
FIG. 6 is a side view of an embodiment of an electrical connection device in a stowed position.

When the electrical connection device 29 is fully deployed, as shown in FIG. 5, it allows electrical current to flow from the guideway to the vehicle. Advantageously, as shown in FIG. 6, when electrical power is not desired, or the vehicle is not adjacent to the guideway, the support arm 16 can be retracted to place the electrical connection device in a stowed position.

Figure 7:
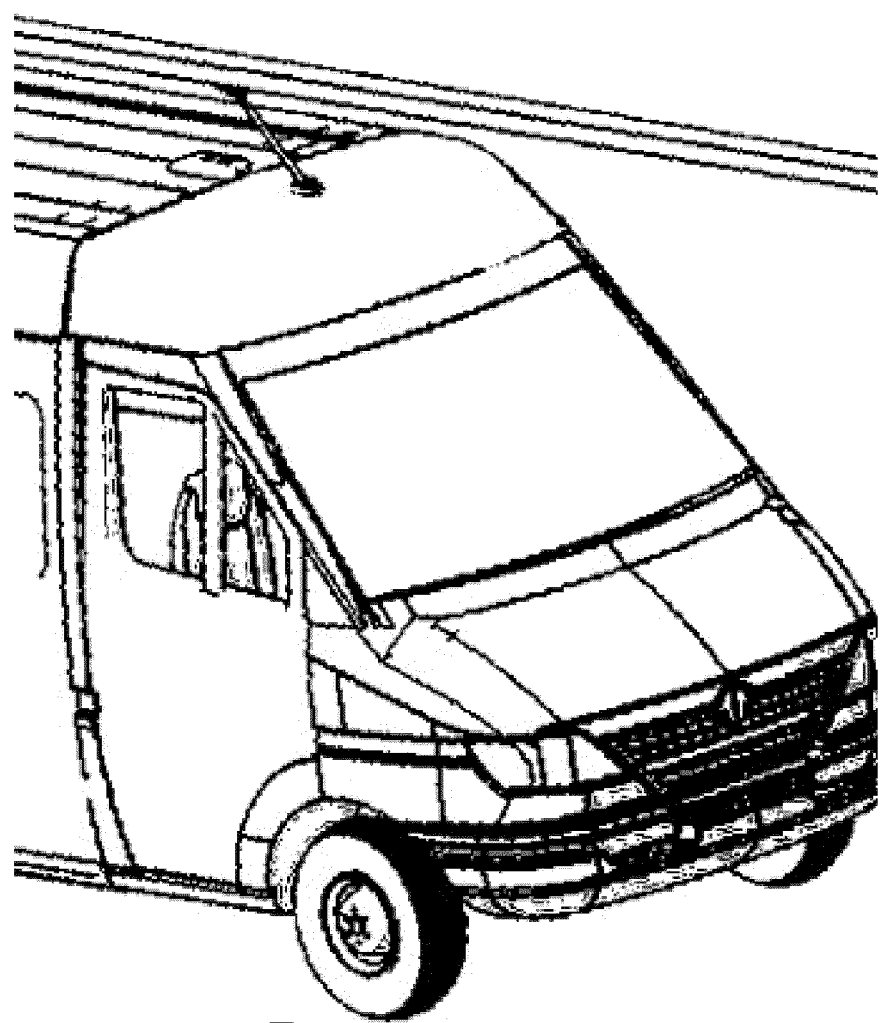
FIG. 7 is a perspective view of a vehicle having an embodiment of an electrical connection device in accordance with the present disclosure, illustrating the six degrees of freedom and the longitudinal and latitudinal axis definition in relation to the vehicle, guideway and guideline.
Figure 7:
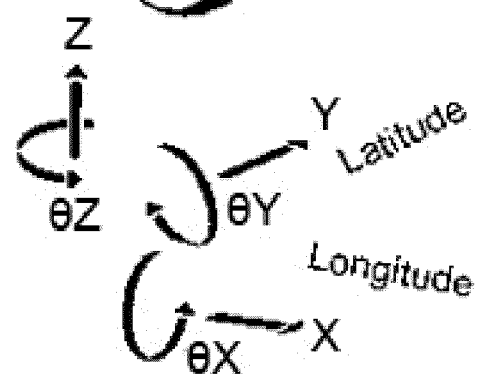

Advantageously, the support arm and air bearing design of the electrical connection device provide six-degrees-of-freedom of movement, as illustrated in FIG. 7. Also shown in this figure are the Longitudinal and Latitudinal axes defined in relation to the guideline, the vehicle and the EV Mouse.

The advantages of the present invention include, without limitation, an exceedingly easy electrical connection device to an electrical-interconnection, while the EV is in motion, and potentially, while parking. To achieve reasonable proximity with a manually operated vehicle, this can include a display, or communication of, offset and alignment feedback.

The magnets and air bearing combination provide precision constraint with two rotational axis-of-freedom ($\theta x$ and $\theta y$ indicated in FIG. 7). The magnets and air bearing also provide precision constraint to the elevation, even with significant road perturbations. The orientation of the vehicle and the rotational base (27 in FIG. 4), constrain the third rotational axis of freedom ($\theta z$). The two magnets also give additional precision to the third rotational axis of freedom ($\theta z$).

The longitudinal degree-of-freedom is controlled by the forward motion of the vehicle.

The general proximity of the latitudinal, degree-of-freedom is controlled by vehicle steering. Once the EV Mouse is fully deployed, the two magnets provide more precise latitudinal guidance (see FIG. 7 for the latitudinal axis definition). Vehicle roll could be accounted for by accelerometer(s), shock displacement, or potentially, other instrumentation. Under normal road conditions the magnets provide precision latitudinal guidance and rotational alignments.

Lost connection, or extreme movement could trigger a quick withdrawal of the EV Mouse and reinitiation of the deployment sequence.

In comparison to traditional trolley bus electrical connections, the relatively light EV Mouse can be deployed intermittently for rapid connection at virtually any point, where the guideway is available. This reduces overhead complexity at intersections. An articulating boom could raise the light arm, and small EV Mouse to the guideway from a relatively large distance, such as a distance from a sedan roof, making the electrical connection device of the present invention viable for common private vehicles to connect to an electric grid while in motion.

Figure 8A:
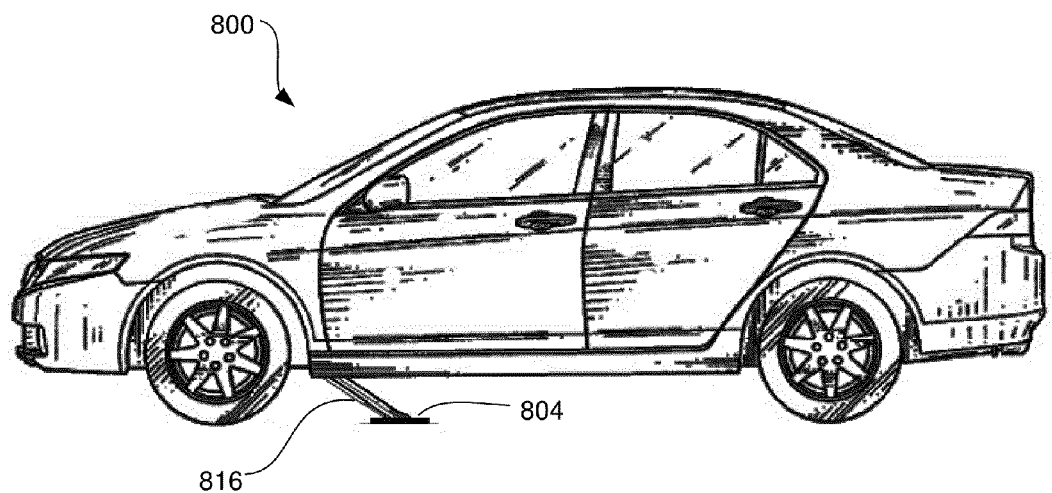
FIGS. 8A and 8B are side and front views, respectively, of a vehicle having an embodiment of an electrical connection device extended downward toward a guideway positioned below the vehicle.
Figure 8B:
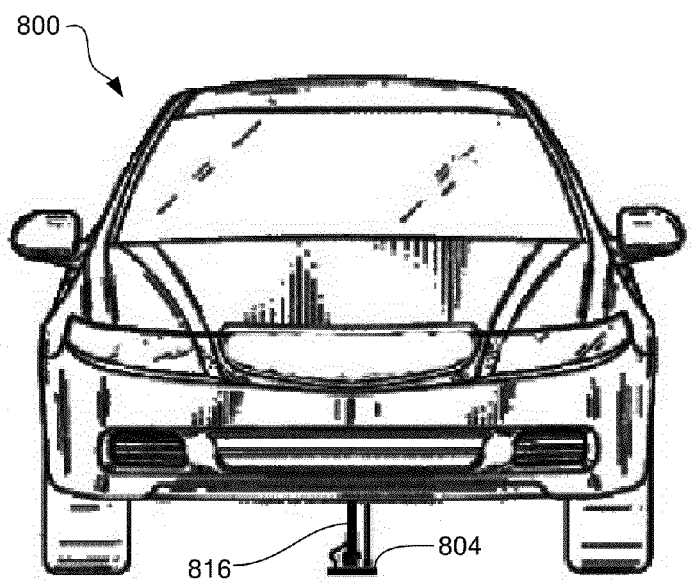

As noted above, the EV Mouse can be alternatively configured to extend downward from a vehicle, to receive power from a guideway below the vehicle, such as in a roadway surface. This configuration is shown in FIGS. 8A and 8B, wherein a vehicle 800 includes an embodiment of an electrical connection device 804, configured in accordance with this disclosure, disposed at a lower end of an arm 816 that is extended downward toward the roadway surface that supports the vehicle. A guideway, as discussed herein, can be included in the roadway surface, and the electrical connection device 804 tracks this guideway and receives power therefrom in accordance with the present disclosure. The arm 816 can be raised (e.g. into the undercarriage of the vehicle 800) or lowered as desired (or in response to an automatic system) to connect to the guideway. The arm 816 is oriented in a trailing position, which, when the arm is deployed, allows it to rise and fall with undulations or irregularities in the roadway surface. The air cushion provided by the air bearing also helps limit contact and reduce wear against the roadway/guideway. Other devices can also be used to reduce friction and wear to the electrical connection device. For example, guide wheels or rollers can be provided at the end of the arm for this purpose.

As another alternative, the guideway can be provided to a side of the vehicle, if desired, and in such case the EV Mouse can be attached to an arm that extends laterally (lattitudinally) from the vehicle to be placed adjacent to the guideway.

The stable proximity of the air-bearing to the guideway reduces friction, noise and mechanical wear. The electrical ribbon connections (19, 20 and 21) can be configured to reach slightly beyond the face of the air bearing to receive or transmit electrical power with a light touch or when the electric ribbon connection are very close to the electric tracks. When reduced current is detected, due to wear in the electrical-connecting ribbon, the height adjuster (12 in FIG. 2B) can extend the height of the electrical ribbon connections.

In a broad embodiment, the electrical interconnection device described herein allows electric power to pass between a guideway and an electric vehicle. The guideway and its electric power delivery is an electrical interconnection system for electrical vehicles. While an Electric Vehicle moves, precision distance is maintained between the guideway and the electric connection device by an air bearing. Magnets in the air bearing assist in the elevation, latitudinal and rotational precision by tracking a guideline (a ferrous line or magnetized line, or line of magnets) in the guideway. Off-center feedback aids vehicle guidance. After the EV Mouse is fully deployed, magnets provide latitude and rotational alignment precision and adhesion to the guideway's surface.

While the description presented herein discloses an electrical connection for various EV Mouse configurations—AC electric-power delivery, DC electric-power delivery, or inductance power-delivery—those of ordinary skill will understand and appreciate the existence of variations, combinations, and equivalents of the specific embodiments, methods, and examples herein. The invention should therefore not be limited by the above described embodiment, method, and examples, but by all embodiments and methods within the scope of the disclosure and the appended claims.

In comparison to the internal combustion engine, direct electric-power delivery to EVs can make them more competitive, winning broader acceptance, and potentially ending long-term EV subsidies. The most efficient EV framework will reduce harmful emissions. Direct electric-power delivery to EVs can help reduce the size and cost of electric vehicle battery packs, without reducing performance. This reccurring capital and maintenance cost-per-vehicle is significant.

By way of example, and without limitation, the present disclosure provides an electrical connection device for an electric vehicle, comprising an arm, attached to a moving vehicle, and an air bearing pickup device, disposed at a distal end of the arm. The air bearing device is positionable adjacent to a conductor associated with the guideway, and includes an air inlet positioned to provide a flow of air between the guideway and the air bearing device. The air bearing device includes an induction coil, disposed around its circumference, the induction loop being configured to sense ferrous and/or magnetic material in the conductor via the Hall Effect, and may receive electric power from the conductor.

The arm can have a loose joint at the air-bearing device, allowing the air bearing device to passively fit flush to the conductor, reducing the need for active rotational EV Mouse moment-control on the longitudinal axis.

The arm can have free-floating rotational movement, allowing sensing of rotational movement for guidance feedback by indicating the latitudinal difference between the guideline and the vehicle, once the vehicle roll is factored, to aid steering guidance for a vehicle.

The air-bearing device can include magnets for tracking a guideline in the guideway. In one embodiment, the magnets can be in close proximity to the front and back of the air bearing.

The air bearing device can be configured to provide elevational equilibrium between the air-bearing, magnets and ferrous or magnetized guideline to enable efficient electric-power delivery. The air bearing device can also be configured to provide latitudinal guidance by the use of an air bearing, magnets and ferrous or magnetized guideline, to enable efficient electric power delivery.

The air bearing device also helps maintain precise rotational alignment between the guideline and the electrical connection device by the use of an air-bearing, magnets and ferrous or magnetized guideline in a guideway enabling efficient electric power delivery. The use of two magnets can also give additional precision to a third rotational axis of freedom (theta z shown in FIG. 7).

As another example, the present disclosure provides an electric vehicle for use with a guideway, comprising an extensible and retractable arm, attached to the vehicle, and an electrical connection device positioned at a distal end of the arm. The electrical connection device comprises an air bearing device, having means for providing a flow of air between the air bearing device and the guideway, means for transferring electrical power from the guideway to the vehicle, and means for tracking a position of the electrical connection device with respect to the guideway.

The arm can be positioned to extend toward a guideway that is positioned above, below, or to a side of the vehicle.

The means for providing a flow of air between the air bearing device and the guideway can include at least one air inlet in the air bearing device, oriented to direct the flow of air to provide a cushion of air between the air bearing device and the guideway.

The means for transferring electrical power from the guideway to the vehicle can include at least one electrical contact for receiving electrical power from the guideway. The electrical contact can receive power from the guideway through near physical contact or physical contact with a conductor of the guideway across a gap between the conductor of the guideway with at least one electrical contact.

The means for transferring electrical power from the guideway to the vehicle can include an induction coil, associated with the electrical connection device, positioned to receive current from the conductor through inductance as the induction coil moves near electrical, inductance coils in the guideway.

The means for tracking a position of the electrical connection device with respect to the guideway can include permanent magnets, disposed in the electrical connection device, and configured to magnetically align with a guideline of the guideway.

The means for tracking a position of the electrical connection device with respect to the guideway can include an induction coil, or coils, disposed in the electrical connection device, and configured to provide an induced current as a result of motion adjacent to a guideline of the guideway, characteristics of the induced current indicating distance of the electrical connection device with the guideway and/or guideline.

It is to be understood that the above-referenced arrangements are only illustrative of the application of the principles of the present invention in one or more particular applications. Numerous modifications and alternative arrangements in form, usage and details of implementation can be devised without the exercise of inventive faculty, and without departing from the principles, concepts, and scope of the invention as disclosed herein. Accordingly, it is not intended that the invention be limited, except as by the claims.

What is claimed is:

1. An electrical connection device for an electric vehicle, comprising:

an arm, attached to a moving vehicle; and
an air-bearing electrical-pickup device, disposed at a distal end of the arm, positionable adjacent to an electric-powered guideway and configured to receive electrical power therefrom, the air bearing electrical-pickup device including:
   an air outlet positioned to provide a flow of air between the guideway and the air bearing device; and
   an induction loop, disposed in the electrical pickup device, configured to sense ferromagnetic material in the guideway.

2. An electrical connection device in accordance with claim 1, wherein the induction loop is configured to track a guide line in the guideway.

3. An electrical connection device in accordance with claim 1, wherein the arm is freely rotatable with respect to the vehicle.

4. An electrical connection device in accordance with claim 1, wherein the air-bearing device includes a magnet for tracking a guideline in the guideway.

5. An electrical connection device in accordance with claim 4, wherein the magnet comprises two magnets in close proximity to the front and back of the air bearing, the magnets assisting in the elevational, latitudinal and rotational tracking of the guideline.

6. An electrical connection device in accordance with claim 1, further comprising at least one electrical contact, disposed upon the air bearing device, configured to receive electrical power from the guideway.

7. An electrical connection device in accordance with claim 6, wherein the electrical contact is configured to receive power from the guideway through either physical contact with a conductor of the guideway, or through transfer of electrical power across a gap between the conductor of the guideway and the at least one electrical contact.

8. An electrical connection device in accordance with claim 1, wherein the induction loop is configured to receive electrical power transmitted from the guideway via inductive coupling.

9. An electric vehicle for use with a guideway, comprising:
   an extensible and retractable arm, attached to the vehicle; and
   an electrical connection device, positioned at a distal end of the arm, having an air bearing device, having
   means for providing a flow of air between the air bearing device and the guideway, including at least one air outlet in the air bearing device, oriented to direct the flow of air between the air bearing device and the guideway;
   means for transferring electrical power from the guideway to the vehicle; and
   means for tracking a position of the electrical connection device with respect to the guideway.

10. An electric vehicle in accordance with claim 9, wherein the arm is configured to extend toward the guideway that is one of above the vehicle and below the vehicle.

11. An electric vehicle in accordance with claim 9, wherein the means for transferring electrical power from the guideway to the vehicle includes at least one electrical contact for receiving electrical power from the guideway.

12. An electric vehicle in accordance with claim 11, wherein the electrical contact is configured to receive power from the guideway through either physical contact with a conductor of the guideway, or through transfer of electrical power across a gap between the conductor of the guideway and the at least one electrical contact.

13. An electric vehicle in accordance with claim 9, wherein the means for transferring electrical power from the guideway to the vehicle comprises an induction coil, in the electrical connection device, configured to draw power from the guideway through inductive coupling.

14. An electric vehicle in accordance with claim 13, wherein the induction coil is a Hall Effect device.

15. An electric vehicle in accordance with claim 9, wherein the means for transferring electrical power from the guideway to the vehicle includes an induction coil, associated with the electrical connection device, positioned to receive current from the conductor through inductance as the induction coil moves near the guideway.

16. An electric vehicle in accordance with claim 9, wherein the means for tracking a position of the electrical connection device with respect to the guideway includes permanent magnets, disposed in the electrical connection device, the permanent magnets being configured to magnetically align with a guideline of the guideway.

17. An electric vehicle in accordance with claim 9, wherein the means for tracking a position of the electrical connection device with respect to the guideway includes an induction coil, disposed in the electrical connection device, configured to provide an induced current as a result of motion adjacent to a guideline of the guideway, characteristics of the induced current indicating a distance of the electrical connection device from the guideline.

18. An electric vehicle in accordance with claim 17, wherein the induction coil is a Hall Effect device.

19. An electric vehicle in accordance with claim 18, wherein the Hall Effect device is configured to draw power from the guideway through inductive coupling.

* * * * *